United States Patent
Cox et al.

(10) Patent No.: US 10,507,462 B2
(45) Date of Patent: Dec. 17, 2019

(54) METHODS FOR CATALYST STRIPPING

(71) Applicant: UOP LLC, Des Plaines, IL (US)

(72) Inventors: Pelin Cox, Des Plaines, IL (US); William D. Schlueter, Raymondville, MO (US); William Yanez, Crystal Lake, IL (US); Jeffrey Grott, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 53 days.

(21) Appl. No.: 15/798,333

(22) Filed: Oct. 30, 2017

(65) Prior Publication Data
US 2018/0050334 A1 Feb. 22, 2018

Related U.S. Application Data

(63) Continuation of application No. PCT/US2016/037558, filed on Jun. 15, 2016.

(60) Provisional application No. 62/184,416, filed on Jun. 25, 2015.

(51) Int. Cl.
*B01J 38/04* (2006.01)
*B01J 8/12* (2006.01)
*B01J 38/02* (2006.01)
*B01J 38/10* (2006.01)
*B01J 29/90* (2006.01)

(52) U.S. Cl.
CPC .............. *B01J 38/04* (2013.01); *B01J 8/125* (2013.01); *B01J 29/90* (2013.01); *B01J 38/02* (2013.01); *B01J 38/10* (2013.01); *C10G 2300/4093* (2013.01)

(58) Field of Classification Search
CPC ... B01J 38/04; B01J 8/125; B01J 29/90; B01J 38/02; B01J 38/10
USPC ....................................................... 502/256
See application file for complete search history.

(56) References Cited

U.S. PATENT DOCUMENTS

| | | | |
|---|---|---|---|
| 4,820,404 | A | 4/1989 | Owen |
| 4,917,790 | A | 4/1990 | Owen |
| 5,015,363 | A | 5/1991 | Cetinkaya |
| 5,800,697 | A | 9/1998 | Lengemann |
| 7,037,871 | B1 | 5/2006 | Galperin et al. |
| 7,273,543 | B2 | 9/2007 | Letzsch |
| 8,173,567 | B2 | 5/2012 | Palmas et al. |
| 2004/0184970 | A1 | 9/2004 | Lu et al. |
| 2014/0213428 | A1 | 7/2014 | Hedrick et al. |
| 2014/0296058 | A1 | 10/2014 | Sechrist et al. |

FOREIGN PATENT DOCUMENTS

| | | |
|---|---|---|
| CN | 101474582 B | 5/2011 |
| GB | 729806 | 9/1952 |
| WO | 2013142044 A2 | 9/2013 |

OTHER PUBLICATIONS

Search Report dated Oct. 20, 2016 for corresponding PCT Appl. No. PCT/US2016/037558.
Johnson, "FCC for the 1990's: New hardware developments", AIChE Symposium Series, vol. 88 (291), pp. 88-95.
Letzsch, "Changes in catalytic cracking", Hydrocarbon Engineering, vol. 7 (7), pp. 85-88.
Supplemental European Search Report from corresponding European patent application No. EP16815070, dated Feb. 14, 2019.
International Preliminary Report on Patentability for PCT application No. PCT/US2016/037558, dated Dec. 26, 2017.
Written Opinion of the International Searching Authority for PCT application on. PCT/US2016/037558, dated Oct. 6, 2016.

*Primary Examiner* — Edward M Johnson

(57) ABSTRACT

A process is disclosed for an improved catalyst stripping process. The stripping vessel is divided into two zones. The first zone is a stripping zone where a substantial portion of the volatile hydrocarbons is removed at higher severity conditions. After the catalyst is stripped, the stripped catalyst moves to the lower cooling zone to be cooled at lower severity conditions. The flow rates, temperatures, pressures and the stripping and cooling zones are designed to ensure there is minimal volatile hydrocarbons on the catalyst by the time it leaves the stripping vessel. This design enables efficient stripping of volatile hydrocarbons at high severity conditions and eliminates these components from being stripped off elsewhere in the unit causing process and equipment issues.

20 Claims, 2 Drawing Sheets

METHODS FOR CATALYST STRIPPING

CROSS-REFERENCE TO RELATED APPLICATIONS

This application is a Continuation of copending International Application No. PCT/US2016/037558 filed Jun. 15, 2016 which application claims benefit of U.S. Provisional Application No. 62/184,416 filed Jun. 25, 2015, now expired, the contents of which cited applications are hereby incorporated by reference in their entirety.

FIELD

The present subject matter relates generally to methods for catalyst stripping. More specifically, the present subject matter relates to methods for stripping and cooling a catalyst for reuse in the hydrocarbon conversion process.

BACKGROUND

Hydrocarbons, and in particular petroleum, are produced from the ground as a mixture. This mixture is converted to useful products through separation and processing of the streams in reactors. The conversion of the hydrocarbon streams to useful products is often through a catalytic process in a reactor. The catalysts can be solid or liquid, and can comprise catalytic materials. In bi-functional catalysis, catalytic materials of acid such as zeolite and metals such as those in transition and main groups are combined to form a composite to facilitate the conversion process such as the one described in this subject application.

During the processing of the hydrocarbons, the catalysts deactivate over time. One primary cause of deactivation is the generation and buildup of non-volatile coke on the catalyst. The accumulation of non-volatile coke covers or blocks access to catalytic sites on the catalyst therefore, the spent catalyst is regenerated and returned to the reactor for further use. The regeneration of the catalyst is normally performed through the removal of the coke, where the coke is combusted at a high-temperature with a gas having oxygen. During the processing of the hydrocarbons, in addition to non-volatile coke lay down on the catalyst volatile hydrocarbons are also absorbed onto the catalyst. Prior to regeneration it is desirable to remove or strip the volatile hydrocarbons from the spent catalyst. Volatile hydrocarbons if not stripped properly will come off during high temperature regeneration or reactor conditions and faul the associated equipments such as reactor and regenerator internals, compressors, heat exchanging equipment, pipes and other vessels causing significant cleaning cost and reduction in plant operation time due to associated shutdowns. Preferred level of stripping necessitates high severity temperatures to desorb a substantial amount of volatilizable carbonaceous materials. Normally stripping is carried out in a so-called stripper, which is limited to low severeity temperatures enabling the catalyst to be lifted or transported to the regenerator. Low temperature operation invariably causes insufficient stripping of the volatile hydrocarbon species. Normally, this so-called stripper is an elongated vessel provided with side-to-side interior baffle. The spent catalyst is cascaded downwardly over the stripper baffle while the gas stream flowing counter currently to the descending catalyst.

SUMMARY

The present subject matter provides an improved catalyst stripping process. The stripping zone is divided into two zones, a stripping zone and a cooling zone. In the stripping zone, a substantial portion of the residual volatile hydrocarbons is removed at higher severity conditions. After the catalyst is stripped, the stripped catalyst moves to a cooling zone to be cooled at lower severity conditions. The flow rates, temperatures, pressures and the stripping zone are designed to ensure there is minimal volatile hydrocarbon left on the catalyst by the time it leaves the stripping zone. This design eliminates high levels of residual volatile hydrocarbons in both the regeneration zone and the reactors.

In the stripping zone, a first gas is passed into the stripping zone and flows over the catalyst to remove a substantial portion of residual volatile hydrocarbons. The first gas is heated to a temperature between about 200° C. and about 650° C. before passing into the stripping zone. The first gas is distributed around the stripping zone and flows through the catalyst countercurrently passing up through the first stripping zone. The second gas is at a temperature between about 38° C. and about 300° C. before passing into the cooling zone. The second gas flows up through the cooling zone and flows counter currently against the catalyst before exiting the cooling zone. The stripped and cooled catalyst is withdrawn through the catalyst outlet at the bottom of the cooling zone.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

DEFINITIONS

As used herein, the term "dehydrocyclodimerization" is also referred to as aromatization of light paraffins. Within the subject disclosure, dehydrocyclodimerization and aromatization of light hydrocarbons are used interchangeably.

As used herein, the term "stream", "feed", "product", "part" or "portion" can include various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated $C_1$, $C_2$, $C_3$, Cn where "n" represents the number of carbon atoms in the one or more hydrocarbon molecules or the abbreviation may be used as an adjective for, e.g., non-aromatics or compounds. Similarly, aromatic compounds may be abbreviated $A_6$, $A_7$, $A_8$, An where "n" represents the number of carbon atoms in the one or more aromatic molecules. Furthermore, a superscript "+" or "−" may be used with an abbreviated one or more hydrocarbons notation, e.g., $C_{3+}$ or $C_{3-}$, which is inclusive of the abbreviated one or more hydrocarbons. As an example, the abbreviation "$C_{3+}$" means one or more hydrocarbon molecules of three or more carbon atoms.

As used herein, the term "zone" can refer to an area including one or more equipment items and/or one or more sub-zones. Equipment items can include, but are not limited to, one or more reactors or reactor vessels, separation vessels, distillation towers, heaters, exchangers, pipes, pumps, compressors, and controllers. Additionally, an equipment item, such as a reactor, dryer, or vessel, can further include one or more zones or sub-zones.

As used herein, the term "active metal" can include metals selected from IUPAC Groups that include 6, 7, 8, 9, 10, 13 and mixtures of thereof. The IUPAC Group 6 trough 10 includes without limitation chromium, molybdenum, tungsten, rhenium, platinum, palladium, rhodium, iridium, ruthenium, osmium, zinc, copper, and silver. The IUPAC Group 13 includes without limitation gallium and indium.

As used herein, the term "modifier metal" can include metals selected from IUPAC Groups 11-17. The IUPAC Group 11 trough 17 includes without limitation sulfur, gold, tin, germanium, and lead.

As used herein, the term "thermal mass ratio" (TMR) is defined as the ratio of the gas flow rate to the catalyst circulation rate.

As used herein, the term "volatile hydrocarbons" can include hydrocarbons that are aromatic or non-aromatic, straight chain, branched or cyclic aklanes, alkenes and alkadienes.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

The following detailed description is merely exemplary in nature and is not intended to limit the application and uses of the embodiment described. Furthermore, there is no intention to be bound by any theory presented in the preceding background or the following detailed description.

Figure 1:
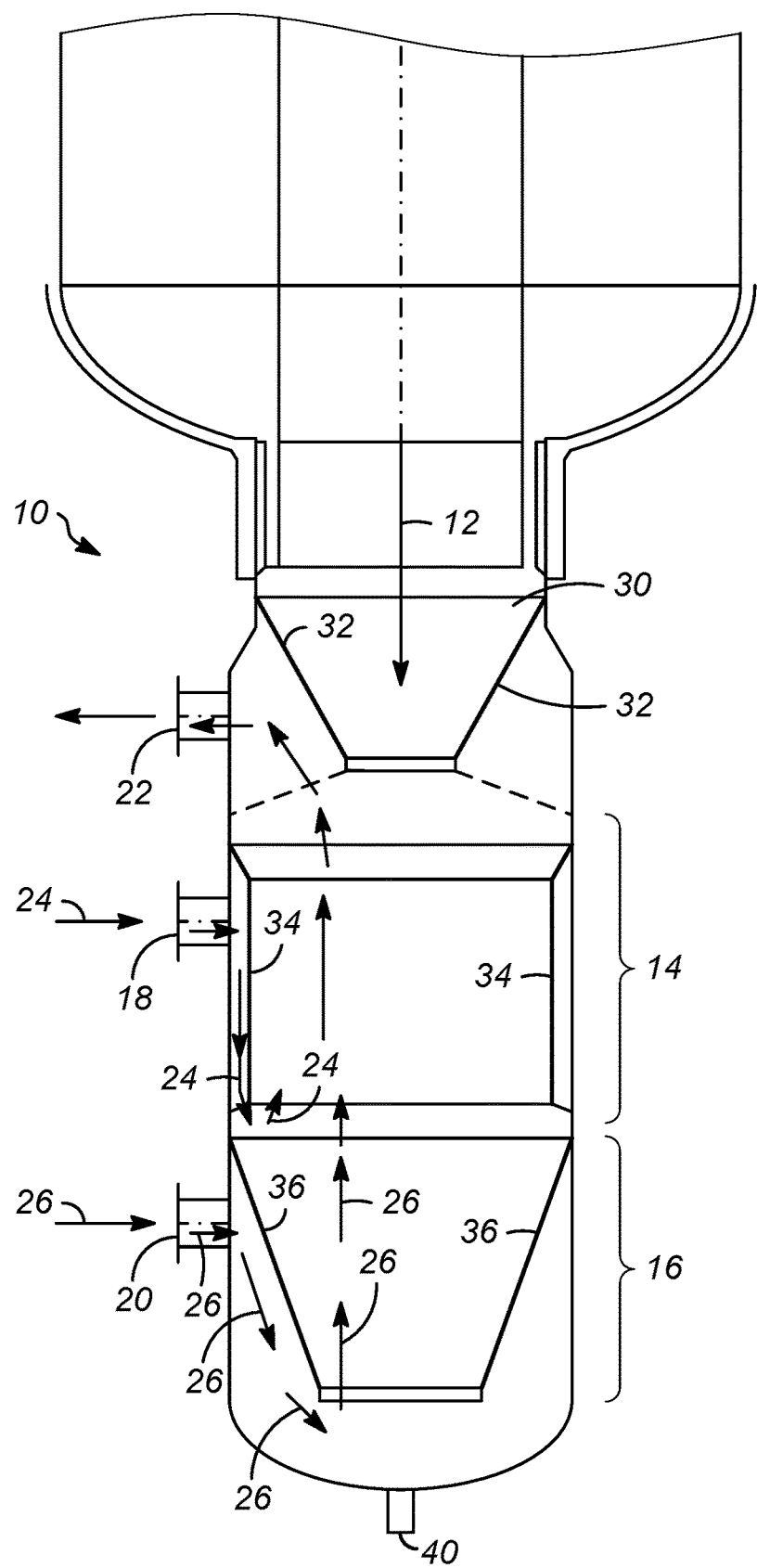
FIG. 1 is a cross-sectional view of a vessel embodying the present invention.

FIG. 1 illustrates a diagram of various embodiments of the processes described herein. Those skilled in the art will recognize that this process flow diagram has been simplified by the elimination of many pieces of process equipment including for example, heat exchangers, process control systems, pumps, fractionation column overhead, reboiler systems and reactor internals, etc. which are not necessary to an understanding of the process. It may also be readily discerned that the process flow presented in the drawing may be modified in many aspects without departing from the basic overall concept. For example, the depiction of required heat exchangers in the drawing have been held to a minimum for purposes of simplicity. Those skilled in the art will recognize that the choice of heat exchange methods employed to obtain the necessary heating and cooling at various points within the process is subject to a large amount of variation as to how it is performed. In a process as complex as this, there exists many possibilities for indirect heat exchange between different process streams. Depending on the specific location and circumstance of the installation of the subject process, it may also be desired to employ heat exchange against steam, hot oil, or process streams from other processing units not shown on the drawing.

With reference to FIG. 1, a system and process in accordance with various embodiments includes a vessel 10. A stream of spent catalyst particles 12 is continuously introduced to the vessel 10. Although the term continuous is applied to this process herein, the process may include a continuous, semi-continuous, or batch process where small amounts of catalyst are withdrawn from the reactor and passed to the stripping zone on a relatively continuous basis. The catalyst particles 12 flow downward through the vessel 10. The catalyst particles 12 may exit from a reactor. The reactor may be a dehydrogenation reactor, a reforming reactor, a dehydrocyclodimerization reactor, or any other reactor used in the conversion of hydrocarbons. The vessel 10 is divided into an upper stripping zone 14 and a lower cooling zone 16. In the example shown in FIG. 1, the upper stripping zone 14 is in communication with the lower cooling zone 16. However, it is also contemplated that there may be an intermediate section. The intermediate section may allow for the separation of the upper stripping zone 14 and the lower cooling zone 16 by interposing the intermediate section in between the upper stripping zone 14 and the lower cooling zone 16. As catalyst particles 12 flow down through the opening 30, the catalyst particles 12 are directed into the upper stripping zone 14 via the baffle 32. The baffle 32 may be conical in shape. The opening of the baffle 32 allows for the catalyst particles 12 to enter the upper stripping zone 14. The top portion of the baffle 32 is connected to the inner wall of the vessel 10 whereas the bottom portion of the baffle 32 is truncated and provides an opening for the catalyst particles 12 to pass through. The bottom portion of the baffle 32 is lower than the outlet 22 so that the catalyst particles 12 entering the upper stripping zone 14 do not interfere with the gas exiting the outlet 22.

In the upper stripping zone 14, a first gas 24 enters through the upper stripping zone inlet 18 and contacts the catalyst particles 12 to reduce the residual volatile hydrocarbons on the catalyst particles 12. After the first gas 24 enters the vessel 10 through the upper stripping zone inlet 18, the first gas is directed downwardly by prevention of upward flow by a cylindrical baffle 34 and then the first gas enters the upper stripping zone 14 and rises up the upper stripping zone 14. In the example illustrated in FIG. 1, the baffle 34 is cylindrical. The top portion of the baffle 34 is connected to the inside of the vessel 10. The baffle 34 curves inward so that the gas entering the inlet 18 has space to enter the upper stripping zone 14. The catalyst particles 12 flow down through the upper stripping zone 14 at a rate to provide sufficient time for the catalyst particles 12 to be thoroughly stripped. The catalyst particles 12 contact the first gas counter-currently. However, it is also contemplated that the catalyst particles 12 may contact the first gas co-currently as well. The catalyst will have an average residence time in the upper stripping zone between about 0.1 hours and about 3 hours, with a preferred time between about 1 hour and about 2 hours. In an aspect, at least about 25 wt % of the totally residual volatile hydrocarbons on the catalyst is removed in the first stripping zone.

The first gas may be cycled through a upper stripping zone 14 using a first blower for circulation of the gas. The first gas may also be cycled using a compressor. The first gas may include hydrogen. However, it is also contemplated that the gas may include $H_2$, $N_2$, Ar, He, $C_1$, $C_2$, $C_3$, $CO_2$, or mixtures thereof. The first gas is heated to a stripping temperature before passing to the upper stripping zone as the first gas stream through inlet 24. The first gas exits the stripping zone 14 through the outlet 22 which may be higher than the inlet 18. The upper stripping zone temperature is between about 200° C. and about 650° C., with a preferable temperature between about 300° C. and about 500° C. The pressure for the upper stripping zone is between about 2 psig (13.7 kPa(g)) to about 75 psig (517 kPa(g)) and thermal mass ratio of the first gas stream is between about 0.8 and about 5.

In the example shown in FIG. 1, the first gas stream 24 flows counter-currently to the catalyst to contact the catalyst particles 12. However, it is also contemplated that the first gas stream 24 may flow co-currently to the catalyst particles 12. The catalyst particles 12 flow downward from the upper stripping zone 14 using gravity. Therefore in the example where the catalyst particles 12 and the first gas stream 24 flow counter-currently, the first gas 24 must enter the first gas stream inlet 18 and exit the first gas stream outlet 22. However, in the example where the catalyst particles 12 and the first gas stream 24 flow co-currently, the first gas stream 24 may enter at opening 22 and exit at opening 18.

FIG. 1 illustrates no intermediate zone. Therefore, the upper stripping zone 14 may be in direct contact with the lower cooling zone 16. Therefore, catalyst particles 12 may flow directly from the upper stripping zone 14 to the lower cooling zone 16.

The catalyst is further processed and flows from the upper stripping zone 14 to the lower cooling zone 16, where the catalyst is contacted with a second gas stream 26 for cooling of the catalyst particles 12. The second gas 26 enters through the lower cooling zone inlet 20 and is cycled through the lower cooling zone 16 using a second blower for circulation of the gas. The second gas 26 may also be cycled using a compressor. The second gas is made up of hydrogen. However it is also contemplated that the second gas may include $H_2$, $N_2$, Ar, He, $C_1$, $C_2$, $C_3$, $C_4$, $CO_2$, air or mixtures thereof. The second gas 26 may be heated or cooled before passing to the lower cooling zone 16 as the second gas stream 26. The second gas 26 exits the vessel 10 through the outlet 22. In the embodiment illustrated in FIG. 1, the first gas stream 24 and the second gas stream 26 both exit the outlet 22.

As illustrated in FIG. 1, as catalyst particles 12 flow down through the lower cooling zone 16 the catalyst particles 12 are directed into the lower cooling zone 16 via the baffle 36. As catalyst particles 12 flow down into the lower cooling zone 16, the catalyst particles 12 are directed into the lower cooling zone 16 via the baffle 36. The baffle 36 may be conical in shape. The opening of the baffle 36 allows for the catalyst particles 12 to enter the lower cooling zone 16. The top portion of the baffle 36 is connected to the inner wall of the vessel 10 whereas the bottom portion of the baffle 36 is truncated and provides an opening for the catalyst particles 12 to pass through. In the lower cooling zone 16, a second gas 26 enters through the lower cooling zone inlet 20 and contacts the catalyst particles 12 to cool the catalyst particles 12. After the second gas 26 enters the vessel 10 through the lower cooling zone inlet 20 the second gas 26 is directed downward via the baffle 36 and then the second gas 26 enters the lower cooling zone 16 and rises up through the lower cooling zone 16. The catalyst particles 12 flow down through the lower cooling zone 16 to provide sufficient time for the catalyst particles 12 to be cooled. The catalyst particles 12 contact the second gas 26 counter-currently. However, it is also contemplated that the catalyst particles 12 may contact the second gas 26 co-currently as well. The second cooling temperature is between about 30° C. and about 300° C., with a preferable temperature between about 50° C. and about 200° C. The pressure for the lower cooling zone is between about 2 psig (13.7 kPa(g)) to about 50 psig (345 kPa(g)) and thermal mass ratio of the second gas stream is between about 0.8 and about 5. Depending on the temperature of the gas and the source the gas comes from, the gas may be have to be heated or cooled to be brought to the preferred temperature.

The lower cooling zone 16 is operated and sized to allow for the catalyst to reside in the lower zone between about 0.1 hours and about 3 hours, with a preferred average residence time between about 1 hour and about 2 hours.

Once the catalyst particles 12 have been stripped in the upper stripping zone 14 and cooled in the lower cooling zone 16, the catalyst particles 12 exit the vessel 10 via the opening 40. Once the catalyst particles 12 leave the vessel 10, they have been sufficiently stripped and cooled so they may be suitable for lifting. The upper stripping zone 14 minimizes the volatile hydrocarbon carryover to the regenerator, and the lower cooling zone 16 ensures that the catalyst is suitable for lifting to the regenerator structure.

An advantage of the catalyst stripping process is that stripping and cooling of the catalyst in two or more separate zones can effectively remove the residual hydrocarbons therefore preventing downstream equipment issues, while keeping the stripping zone size minimal. The present subject matter further includes a lower cooling zone 16 where a separate gas is used to cool the catalyst particles 12.

Figure 2:
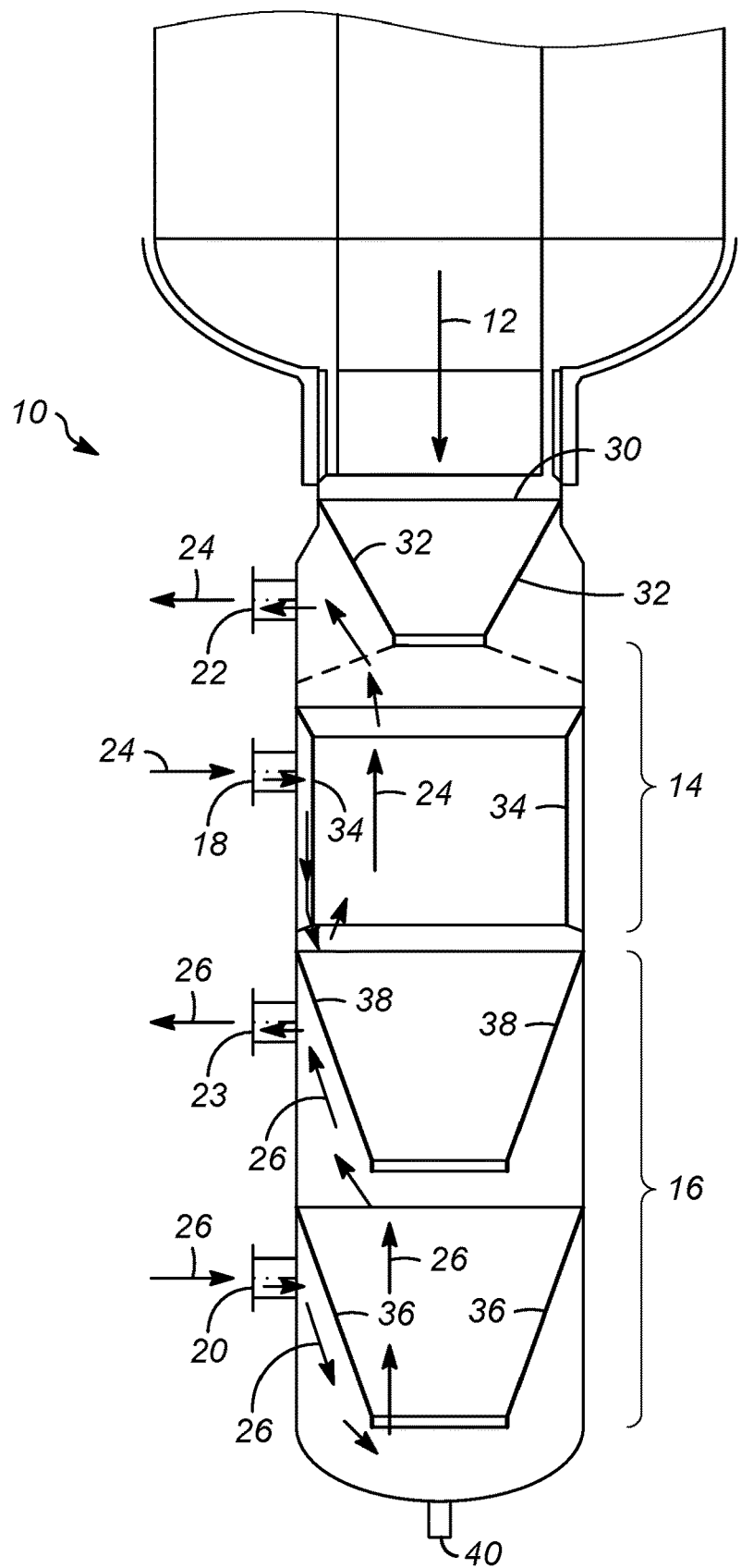
FIG. 2 is a another cross-sectional view of a vessel embodying the present invention.

Another embodiment is illustrated in FIG. 2. In this embodiment, the upper stripping zone 14 and the lower cooling zone 16 each include distinct inlets and outlets. Therefore, in this embodiment, the first gas 24 does not contact the second gas 26. Here, the first gas 24 that enters the upper stripping zone via inlet 18 is directed by the baffle 34 and enters the upper stripping zone 14 and then exits via outlet 22. As illustrated in FIG. 2, the second gas 26 enters the lower cooling zone 16 via inlet 20 and is directed to the lower cooling zone via the baffle 36. The second gas 26 then contacts the catalyst particles 12 in the lower cooling zone 16 and then is directed to the lower cooling zone outlet 23 via the baffle 38 and then exits the lower cooling zone 16 via outlet 23.

As illustrated in FIG. 2, the lower cooling zone 16 has an additional baffle 38. As catalyst particles 12 flow down into the lower cooling zone 16, the catalyst particles 12 are directed into the lower cooling zone 16 via the baffle 38. Also, as explained above, the baffle 38 directs the first gas 24 to the outlet 23. The baffle 38 may be conical in shape. The opening of the baffle 38 allows for the catalyst particles 12 to enter the lower cooling zone 16. The top portion of the baffle 38 is connected to the inner wall of the vessel 10 whereas the bottom portion of the baffle 38 is truncated and provides an opening for the catalyst particles 12 to pass through. Once the catalyst particles 12 exit at the bottom of the baffle 38, the catalyst particles are further directed downward through the lower cooling zone 16 via baffle 36. Once the catalyst particles 12 have been stripped in the upper stripping zone 14 and cooled in the lower cooling zone 16, the catalyst particles 12 exit the vessel 10 via the opening 40. Once the catalyst particles 12 leave the vessel 10, they have been sufficiently stripped and cooled so they may be suitable for lifting. The upper stripping zone 14 minimizes the hydrocarbon carryover to the regenerator, and the lower cooling zone 16 ensures that the catalyst is suitable for lifting to the regenerator structure.

In a further embodiment, the upper stripping zone and the lower cooling zone may be housed in separate vessels. In this embodiment, the first gas would only enter the upper stripping zone in a first vessel, and the second gas would only enter the lower cooling zone in the second vessel. Therefore the catalyst particles would be stripped in the first vessel and cooled in the second vessel.

Another advantage of this method of catalyst stripping and cooling process is that the multiple zones may have temperature control of each inlet gas entering the individual zones. The first gas stream and the second gas stream may include a common gas loop. For example, if the first gas stream and the second gas stream include a common gas loop the first gas and second gas streams may include the same temperature control, the same gas composition control, the same driers, or a mixture thereof. However, it is also contemplated that the first gas stream and the second gas stream may have independent gas loops. For example, in this configuration the composition, temperature, and the drier system of the first gas stream and the second gas stream may be independent.

Any suitable catalyst may be utilized. The catalyst may be amorphous slica-alimuna or such as at least one molecular sieve including any suitable material, e.g., alumino-silicate. The catalyst can include an effective amount of the molecular sieve, which can be a zeolite with at least one pore having a 10 or higher member ring structure and can have one or higher dimension. Typically, the zeolite can have a $Si/A_{12}$ mole ratio of greater than 10:1, preferably 20:1-60:1. Preferred molecular sieves can include BEA, MTW, FAU (including zeolite Y and zeolite X), EMT, FAU/EMT intergrowth, MOR, LTL, ITH, ITW, MFI, MSE, MEL, MFI/MEL intergrowth, TUN, IMF, FER, TON, MFS, IWW, EUO, MTT, HEU, CHA, EM, MWW, AEL, AFO, ATO, and LTA. Preferably, the zeolite can be MFI, MEL, MFI/MEL intergrowth, TUN, IMF MSE and/or MTW. Suitable zeolite amounts in the catalyst may range from 1-100%, and preferably from 10-90%, by weight.

Generally, the catalyst includes at least one metal selected from active metals, and optionally at least one metal selected from modifier metals. The total active metal content on the catalyst by weight is about less than 5% by weight. In some embodiments, the preferred total active metal content is less than about 3.0%, in yet in another embodiment the preferred total active metal content is less than 1.5%, still in yet in another embodiment the total active metal content on the catalyst by weight is less than 0.5 wt %. At least one metal is selected from IUPAC Groups that include 6, 7, 8, 9, 10, and 13. The IUPAC Group 6 trough 10 includes without limitation chromium, molybdenum, tungsten, rhenium, platinum, palladium, rhodium, iridium, ruthenium and osmium, zinc, copper, and silver. The IUPAC Group 13 includes without limitation gallium, indium. In addition to at least one active metal, the catalyst may also contain at least one modifier metal selected from IUPAC Groups 11-17. The IUPAC Group 11 trough 17 includes without limitation sulfur, gold, tin, germanium, and lead.

EXAMPLES

The following examples are intended to further illustrate the subject embodiments. These illustrations of different embodiments are not meant to limit the claims to the particular details of these examples. These examples are based on boiling points of heavy aromatics components.

TABLE 1

| Formula | Name | BP (° C.) | Rings |
|---|---|---|---|
| $C_6H_6$ | Benzene | 80 | 1 |
| $C_{10}H_8$ | Naphthalene | 217 | 2 |
| $C_{14}H_{10}$ | Anthracene | 340 | 3 |
| $C_{16}H_{10}$ | Pyrene | 404 | 4 |
| $C_{20}H_{12}$ | Benzopyrene | 495 | 5 |
| $C_{22}H_{12}$ | Benzoperylene | 497 | 6 |
| $C_{24}H_{12}$ | Coronene | 526 | 7 |
| $C_{28}H_{14}$ | Benzocoronene | 605 | 8 |

Table 1 demonstrates the benefits of having a stripping zone design and a cooling zone as compared to a single stripping zone design operated at low temperatures. As shown in the Table 1, efficient stripping necessitates high severity temperatures to strip off volatile hydrocarbons which inevitably prevents these components from being stripped off elsewhere in the unit causing process and equipment issues.

It should be noted that various changes and modifications to the presently preferred embodiments described herein will be apparent to those skilled in the art. Such changes and modifications may be made without departing from the spirit and scope of the present subject matter and without diminishing its attendant advantages.

Specific Embodiments

While the following is described in conjunction with specific embodiments, it will be understood that this description is intended to illustrate and not limit the scope of the preceding description and the appended claims.

A first embodiment of the invention is a method of stripping and cooling a catalyst comprising feeding a catalyst to a upper stripping zone operating at upper stripping zone conditions; passing a first gas stream comprising gas to the upper stripping zone, thereby generating a stripped catalyst; passing the stripped catalyst to a lower cooling zone operating at lower cooling zone conditions that are less severe than the upper stripping zone conditions; and passing a second gas stream comprising gas to a lower cooling zone, thereby generating a stripped and cooled catalyst. An embodiment of the invention is one, any or all of prior embodiments in this paragraph up through the first embodiment in this paragraph, wherein the upper stripping zone conditions include a temperature from about 200° C. (392° F.) to about 650° C. (1202° F.). An embodiment of the invention is one, any or all of prior embodiments in this paragraph up through the first embodiment in this paragraph, wherein the pressure for the upper stripping zone is between about 2 psig (13.7 kPa(g)) to about 75 psig (517 kPa(g)) and thermal mass ratio of the first gas stream is between about 0.8 and about 5. An embodiment of the invention is one, any or all of prior embodiments in this paragraph up through the first embodiment in this paragraph, wherein at least 25 wt % of the residual volatile hydrocarbons on the catalyst is removed in the upper stripping zone. An embodiment of the invention is one, any or all of prior embodiments in this paragraph up through the first embodiment in this paragraph, wherein the first gas stream flows counter-currently to the catalyst. An embodiment of the invention is one, any or all of prior embodiments in this paragraph up through the first embodiment in this paragraph, wherein the first gas stream flows co-currently to the catalyst. An embodiment of the invention is one, any or all of prior embodiments in this paragraph up through the first embodiment in this paragraph, wherein the upper stripping zone residence times are about between 0.1 hours and about 3 hours. An embodiment of the invention is one, any or all of prior embodiments in this paragraph up through the first embodiment in this paragraph, wherein the lower cooling zone conditions includes a temperature from about 38° C. (100° F.) to about 300° C. (572° F.).

An embodiment of the invention is one, any or all of prior embodiments in this paragraph up through the first embodiment in this paragraph, wherein the pressure for the lower stripping zone is between about 2 psig (13.7 kPa(g)) to about 50 psig(345 kPa(g)) and thermal mass ratio of the first gas stream is between about 0.8 and about 5. An embodiment of the invention is one, any or all of prior embodiments in this paragraph up through the first embodiment in this paragraph, wherein the second gas stream flows counter-currently to the catalyst. An embodiment of the invention is one, any or all of prior embodiments in this paragraph up through the first embodiment in this paragraph, wherein the second gas stream flows co-currently with the catalyst. An embodiment of the invention is one, any or all of prior embodiments in this paragraph up through the first embodiment in this paragraph, wherein the lower cooling zone residence times are between about 0.1 hours and about 3 hours. An embodiment of the invention is one, any or all of prior embodiments in this paragraph up through the first embodiment in this paragraph, wherein the first gas stream contacts the second gas stream in the upper stripping zone before exiting the upper stripping zone. An embodiment of the invention is one, any or all of prior embodiments in this paragraph up through the first embodiment in this paragraph, wherein the first gas stream exits the upper stripping zone from a first distinct outlet, and the second gas stream exits the lowers cooling zone from a second distinct outlet. An embodiment of the invention is one, any or all of prior embodiments in this paragraph up through the first embodiment in this paragraph, wherein the upper stripping zone and the lower cooling zone are housed in separate vessels.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A method of stripping and cooling a catalyst comprising:
    feeding a spent catalyst having absorbed volatile hydrocarbons to an upper stripping zone operating at upper stripping zone conditions;
    passing a first gas stream comprising gas to the upper stripping zone, thereby generating a stripped catalyst;
    passing the stripped catalyst to a lower cooling zone operating at lower cooling zone conditions that are less severe than the upper stripping zone conditions; and
    passing a second gas stream comprising gas to the lower cooling zone, thereby generating a stripped and cooled catalyst.

2. The method of claim 1, wherein the upper stripping zone conditions include a temperature from about 200° C. (392° F.) to about 650° C. (1202° F.).

3. The method of claim 1, wherein the pressure for the upper stripping zone is between about 2 psig (13.7kPa(g)) to about 75 psig (517kPa(g)) and thermal mass ratio of the first gas stream is between about 0.8 and about 5.

4. The method of claim 1, wherein at least 25 wt % of the residual volatile hydrocarbons on the catalyst is removed in the upper stripping zone.

5. The method of claim 1, wherein the first gas stream flows counter-currently to the catalyst.

6. The method of claim 1, wherein the first gas stream flows co-currently to the catalyst.

7. The method of claim 1, wherein the upper stripping zone residence times are about between 0.1 hours and about 3 hours.

8. The method of claim 1, wherein the lower cooling zone conditions includes a temperature from about 38° C. (100° F.) to about 300° C. (572° F.).

9. The method of claim 1, wherein the pressure for the lower stripping zone is between about 2 psig (13.7kPa(g)) to about 50 psig (345kPa(g)) and thermal mass ratio of the second gas stream is between about 0.8 and about 5.

10. The method of claim 1, wherein the second gas stream flows counter-currently to the catalyst.

11. The method of claim 1, wherein the second gas stream flows co-currently with the catalyst.

12. The method of claim 1, wherein the lower cooling zone residence times are between about 0.1 hours and about 3 hours.

13. The method of claim 1, wherein the first gas stream contacts the second gas stream in the upper stripping zone before exiting the upper stripping zone.

14. The method of claim 1, wherein the first gas stream exits the upper stripping zone from a first distinct outlet, and the second gas stream exits the lowers cooling zone from a second distinct outlet.

15. The method of claim 1, wherein the upper stripping zone and the lower cooling zone are housed in separate vessels.

16. The method of claim 1 wherein the upper stripping zone conditions include a temperature from about 200° C. (392° F.) to about 500° C. (932° F.).

17. The method of claim 1, wherein the lower cooling zone conditions includes a temperature from about 50° C. (122° F.) to about 200° C. (392° F.).

18. The method of claim 1 wherein one or more of: the gas in the first gas stream comprises $H_2$, $N_2$, Ar, He, $C_1$, $C_2$, $C_3$, $CO_2$, or mixtures thereof; or the gas in the second gas stream comprises $H_2$, $N_2$, Ar, He, $C_1$, $C_2$, $C_3$, $C_4$, $CO_2$, or mixtures thereof.

19. The method of claim 1, wherein the upper stripping zone residence times are about between 1 hours and about 3 hours.

20. The method of claim 1, wherein the lower stripping zone residence times are about between 1 hours and about 3 hours.

* * * * *